US 6,608,705 B1

(12) United States Patent
Oshima et al.

(10) Patent No.: US 6,608,705 B1
(45) Date of Patent: Aug. 19, 2003

(54) IMAGE READING DEVICE AND FOCUS ADJUSTMENT METHOD THEREOF

(75) Inventors: Toshiaki Oshima, Nagano (JP); Chikashi Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/331,399

(22) PCT Filed: Oct. 21, 1998

(86) PCT No.: PCT/JP98/04755

§ 371 (c)(1),
(2), (4) Date: Jun. 21, 1999

(87) PCT Pub. No.: WO99/21352

PCT Pub. Date: Apr. 29, 1999

(30) Foreign Application Priority Data

Oct. 21, 1997 (JP) .............................. 9-288758
Oct. 21, 1997 (JP) .............................. 9-288759
Oct. 21, 1997 (JP) .............................. 9-288760

(51) Int. Cl.$^7$ ................................. H04N 1/04
(52) U.S. Cl. ....................... 358/475; 358/488; 358/497; 358/474
(58) Field of Search ................. 358/475, 488, 358/474, 497, 494; 250/208.1, 234–236

(56) References Cited

U.S. PATENT DOCUMENTS

| RE31,370 E | * | 9/1983 | Mashimo et al. ............ 396/110 |
| 5,394,205 A | * | 2/1995 | Ochiai et al. ................ 353/101 |
| 5,398,096 A | | 3/1995 | Yagoto ........................ 355/55 |
| 5,508,825 A | * | 4/1996 | Kataoka ...................... 358/474 |
| 5,568,273 A | * | 10/1996 | Sato et al. ................... 358/451 |
| 5,767,989 A | * | 6/1998 | Sakaguchi ................... 358/474 |
| 6,157,468 A | * | 12/2000 | Tsai et al. .................... 358/488 |
| 6,175,429 B1 | * | 1/2001 | Nagaharu et al. ........... 358/475 |

FOREIGN PATENT DOCUMENTS

| DE | 35 10 066 | 5/1986 | ............ G02B/7/11 |
| EP | 0 456 320 A2 | 11/1991 | ......... H04N/5/232 |
| EP | 0 583 874 A | 2/1994 | |
| JP | 61-236272 | 10/1986 | ............ H04N/1/04 |
| JP | 61-237565 | 10/1986 | ............ H04N/1/04 |
| JP | 63-135910 | 6/1988 | ............ G02B/7/11 |
| JP | 2-202264 | 8/1990 | ............ H04N/1/04 |
| JP | 3-64248 | 3/1991 | ............ H04N/1/04 |
| JP | 5-268419 | 10/1993 | ............ H04N/1/04 |
| JP | 5-346537 | 12/1993 | ............ G02B/7/36 |
| JP | 6-118297 | 4/1994 | ............ G02B/7/28 |
| JP | 7-56242 | 3/1995 | ............ G03B/27/34 |
| JP | 7-99565 | 4/1995 | ............ H04N/1/04 |
| JP | 10-187945 | 7/1998 | ............ G06T/1/00 |

OTHER PUBLICATIONS

*Patent Abstracts of Japan*, vol. 1995, No. 07 (Aug. 31, 1995) as it relates to JP 07–099565 dated Apr. 11, 1995 issued to Nikon Corp.
*Patent Abstracts of Japan*, vol. 1995, No. 06 (Jul. 31, 1995) as it relates to JP 07–056242 dated Mar. 3, 1995 issued to Fuji Photo Optical Co., Ltd.

* cited by examiner

*Primary Examiner*—Cheukfan Lee
(74) *Attorney, Agent, or Firm*—Sughrue Mion, PLLC

(57) ABSTRACT

There are provided an image reading apparatus and a focus adjusting method thereof in which focusing can be accurately conducted by a simple moving mechanism. A condenser lens and line sensor can be moved being integrated with each other. When output values obtained when a document on AF line is read by a line sensor are represented by $LS_1$, $LS_2$, $LS_3$, . . . , and when a broken line graph is considered on which the horizontal axis represents a reading position in the horizontal scanning direction and the vertical axis represents an intensity of an output signal, it is judged that the larger the total distance $LM_1+LM_2+$ . . . of the broken lines is, the more accurately the image is in focus. A square root of the sum of the square of a distance between the adjacent reading positions and the square of a difference of intensities of the signals which have been read, is calculated, and it is judged that the larger the sum is, the more accurately the focus is adjusted.

18 Claims, 10 Drawing Sheets

READING POSITION OF LINE SENSOR

IMAGE READING DEVICE AND FOCUS ADJUSTMENT METHOD THEREOF

BACKGROUND OF THE INVENTION

1. Technical Field

The present invention relates to an image reading apparatus for reading a document optically, and a focus adjusting method thereof.

2. Background Art

Concerning a focus adjusting method used for an image reading apparatus for reading a document optically, there is provided a conventional method in which a distance from a condenser lens to an optical sensor is adjusted while both the condenser lens and the optical sensor such as CCD line sensor are independently moved, and the degree of contrast of one line of an image, which has been read by the optical sensor, is measured with respect to a plurality of distances, and it is judged that the image is in focus at a position of the optical sensor at which the maximum degree of contrast is obtained. Concerning the degree of contrast, a difference between the maximum and the minimum of luminance of the image to be read, or a total of absolute values of differences between values which have been read by the adjacent photoelectric transfer elements is calculated, and it is judged that the higher the value is, the more intense the degree of contrast becomes.

However, when the above conventional method is adopted, the following disadvantages may be encountered. In order to move both the condenser lens and the optical sensor independently, the moving mechanism necessarily becomes complicated. Further, when a large black solid region or a large white solid region exists on the document, that is, when a space frequency of the document is low, there is provided a small difference between the degree of contrast when the image is in focus and the degree of contrast when the image is out of focus, by the method in which the focusing position is found by calculating the degree of contrast as described above. Accordingly, it is impossible to accurately adjust the focus.

In the above focus adjusting method, when the condenser lens is moved in order to change a distance from the document to the condenser lens, the condenser lens may be minutely shifted in a direction which is not parallel to the optical path. In this case, a reading position of the line sensor in the direction of vertical scanning is shifted from a right position. When the condenser lens is moved more accurately, the reading position is not shifted from the right position, however, the manufacturing cost is remarkably increased. Therefore, improvements in the accuracy are limited. When the reading position is shifted from the right position, the degree of contrast is compared at different positions on the document. Therefore, it is impossible to find the focal distance accurately. When the apparatus is composed in such a manner that both the condenser lens and the line sensor can be independently moved, the moving mechanism necessarily becomes complicated.

When a length of the optical path from the document to the condenser lens is changed, a discrepancy may be caused between a position on the document which is read by the same element of the line sensor before the change and a position on the document which is read by the same element of the line sensor after the change. Therefore, a range of the image to be read before the change in the optical path length is different from a range of the image to be read after the change in the optical path length. When the degree of contrast is simply found by an output signal of a pixel in the same range of the line sensor in the case of focusing, it results in a comparison of the contrast with respect to different ranges of the image in the horizontal scanning direction on the document. Therefore, it is impossible to conduct focusing accurately.

SUMMARY OF THE INVENTION

The present invention has been accomplished in view of the above circumstances. It is an object of the present invention to provide an image reading apparatus in which focusing can be accurately conducted by a simple moving mechanism. Also, it is an object of the present invention to provide a focus adjusting method thereof. It is another object of the present invention to provide an image reading apparatus in which an error caused by the deviation of a reading position in the vertical scanning direction in the case of adjusting the focus can be reduced. Also, it is another object of the present invention to provide a focus adjusting method thereof. It is still another object of the present invention to provide an image reading apparatus in which a document can be read in the same range in the horizontal scanning direction at all times so that the focus can be more accurately adjusted. Also, it is still another object of the present invention to provide a focus adjusting method thereof.

In order to accomplish the above objects, an image reading apparatus of the present invention comprises: a condenser lens for condensing light sent from a document; an optical sensor for converting light sent from the condenser lens into an electric signal; an optical path length adjusting means for integrally moving the condenser lens and the optical sensor so as to adjust an optical path length between the document and the condenser lens; a calculating means for storing a signal obtained when the optical sensor reads a reading line on the document by a plurality of optical path lengths and also for calculating a value showing the degree of focusing at each optical path length; and a control means for giving a command to the optical path length adjusting means so that the value showing the degree of focusing can be maximized. Since the condenser lens and the optical sensor are integrally moved, it is possible to conduct focusing accurately without using a complicated moving mechanism.

A focus adjusting method of an image reading apparatus the present invention comprises the steps of: (a) moving the condenser lens and the optical sensor integrally so as to adjust an optical path length between the document and the condenser lens; (b) reading luminance of a reading line on the document by the optical sensor and converting the luminance into an electric signal; (c) calculating a value showing the degree of focusing by the electric signal obtained in step (b); (d) repeating steps (a), (b) and (c) by a plurality of optical path lengths; (e) finding an optical path length by which the value showing the degree of focusing is maximized; (f) adjusting an optical path length so that it can be the optical path length found in step (e).

An image reading apparatus and its focus adjusting method of the present invention use a line sensor having a plurality of photoelectric transfer elements as an optical sensor.

In an image reading apparatus and its focus adjusting method of the present invention, a value showing the degree of focusing is a total of the square root of the sum of the square of a predetermined value corresponding to a distance between the adjacent reading positions to be read by the optical sensor, and the square of a difference of luminance signals at the adjacent reading positions. Accordingly, even in the case of an image having a large solid black region and large solid white region, that is, even in the case of an image, the space frequency of which is low, it is possible to conduct focusing accurately. A square root of the sum of the square of a distance between the reading positions adjacent to each reading position and the square of a difference of luminance signals, which have been read, corresponds to a length of a straight line which connects points representing an intensity of luminance signal at the reading position on a graph, the horizontal axis of which is a reading position and the vertical axis of which is an intensity of the luminance signal which has been read, and a sum of the square roots corresponds to a total length of the lines on the broken line graph.

An image reading apparatus of the present invention comprises: a condenser lens for condensing light sent from a document; a line sensor having a plurality of photoelectric transfer elements for converting light sent from the condenser lens into an electric signal; an optical path length adjusting means for adjusting an optical path length between the document and the condenser lens; a calculating means for storing a signal obtained when the line sensor reads a plurality of reading lines on the document and also for calculating a value showing the degree of focusing at each line; and a control means for giving a command to the optical path length adjusting means so that a sum of the values showing the degree of focusing on a plurality of lines can be maximized.

Accordingly, even when the document reading position deviates in the vertical scanning direction in the process of adjusting the focus, an error caused by the deviation can be reduced by using a total of the values showing the degree of focusing on a plurality of lines. Therefore, focusing can be accurately conducted.

A focus adjusting method of an image reading apparatus of the present invention comprises the steps of: (a) adjusting an optical path length between the condenser lens and the document; (b) reading a plurality of lines on the document by the line sensor and calculating a value showing the degree of focusing on each line; (c) repeating steps (a) and (b) by a plurality of optical path lengths; (d) finding an optical path length by which the value showing the degree of focusing is maximized on the plurality of lines; and (e) adjusting an optical path length between the condenser lens and the document so that it can be the optical path length found in step (d).

In an image reading apparatus and its focus adjusting method of the present invention, the optical path length adjusting means is a means in which the condenser lens and the line sensor are integrally moved, and the optical path length adjusting step is a step in which the condenser lens and the line sensor are integrally moved.

In the focus adjusting method of the present invention, a plurality of lines are read at intervals in step (b). Since a plurality of lines are read at intervals in step (b), it is possible to reduce a period of time required for reading while a wide reading range is ensured in the step of adjusting the focus. Therefore, it is possible to adjust the focus in a short period of time. Concerning the value showing the degree of focusing, when a broken line graph is considered, the horizontal axis of which represents a reading position of the document in the horizontal scanning direction and the vertical axis of which represents an output value, a total length of the broken lines or a value of the degree of contrast of the signal which has been obtained by reading the document may be used as a value showing the degree of focusing.

An image reading apparatus of the present invention comprises: a condenser lens for condensing light sent from a document; a line sensor having a plurality of photoelectric transfer elements for converting light sent from the condenser lens into an electric signal; an optical path length adjusting means for adjusting an optical path length between the document and the condenser lens; and a means for correcting positions of the photoelectric transfer elements on the line sensor used for reading according to the optical path length. Due to the foregoing, it is possible to read an image of the same range of the line sensor in the horizontal scanning direction before and after a change in the optical path length. Concerning the value showing the degree of focusing, when a broken line graph is considered, the horizontal axis of which represents a reading position of the document in the horizontal scanning direction and the vertical axis of which represents an output value, a total length of the broken lines or a value of the degree of contrast of the signal which has been obtained by reading the document may be used as the value showing the degree of focusing.

A focus adjusting method of an image reading apparatus of the present invention comprises the steps of: (a) adjusting an optical path length between the condenser lens and the document; (b) correcting positions of the photoelectric transfer elements on the line sensor used for reading according to the optical path length; (c) calculating a value showing the degree of focusing when the document is read by the photoelectric transfer elements located at the corrected positions on the line sensor; (d) repeating steps (a), (b) and (c) by a plurality of optical path lengths; (e) finding an optical path length by which the value showing the degree of focusing is maximized; and (f) adjusting an optical path length between the condenser lens and the document so that it can be the optical path length found in step (e).

An image reading apparatus of the present invention further comprises: a means for calculating a value showing the degree of focusing on a plurality of optical path lengths when the document is read by the photoelectric transfer elements, the positions of which have been corrected, on the line sensor; and a control means for giving a command to the optical path length adjusting means so that the value showing the degree of focusing can be maximized. Due to the foregoing, even when an optical path length between the document and the condenser lens is changed in the process of adjusting the focus, it is possible to read the same range on the document in the horizontal scanning direction. Therefore, focusing can be more accurately conducted.

The image reading apparatus and the focus adjusting method of the present invention will be more apparent to those skilled in the art on consideration of the most preferred embodiment and the accompanying drawings.

THE MOST PREFERRED EMBODIMENT

Referring to the accompanying drawings, embodiments of the present invention will be explained in detail below.

First Embodiment

Figure 2:
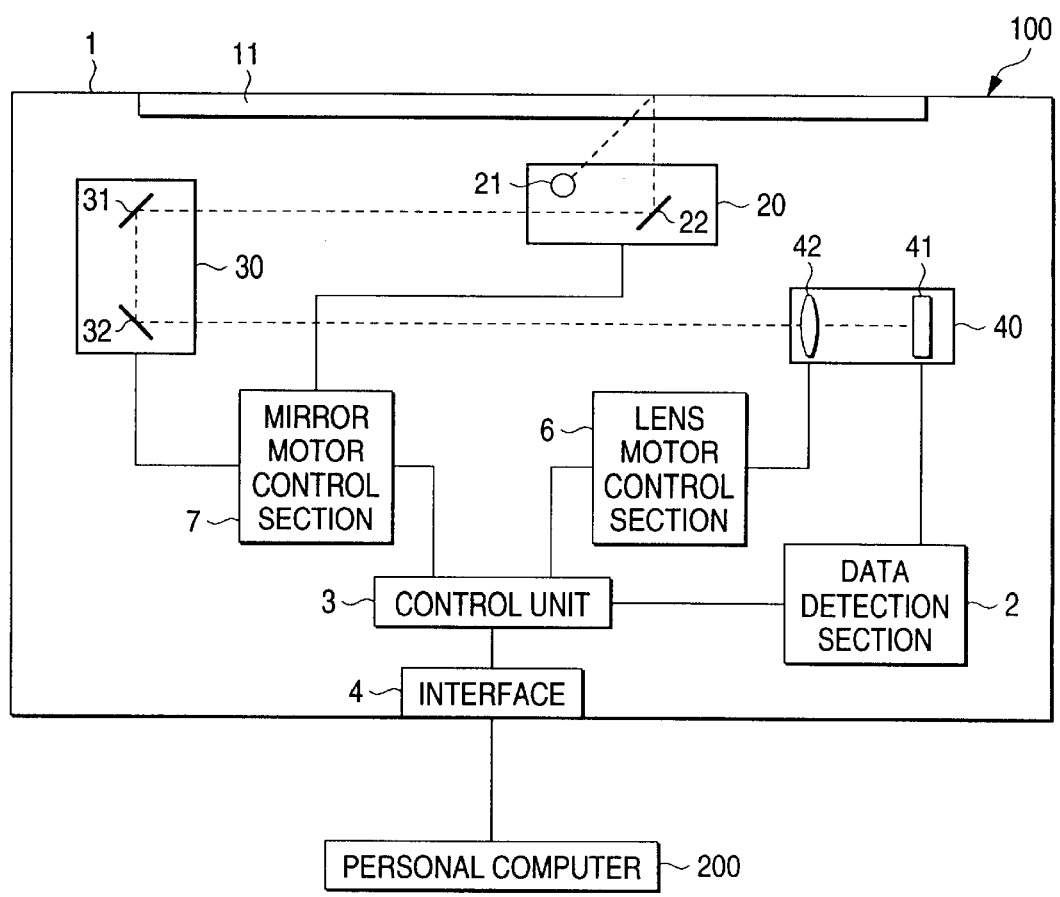
FIG. 2 is a block diagram showing an image reading apparatus of the first embodiment of the present invention.

FIG. 2 is a view showing a flat bed type image reading apparatus 100 of the first embodiment of the present invention.

On an upper face of a box-shaped casing 1, there is provided a document glass 11 on which a document to be read is set. In the casing 1, there are provided a first carriage 20, second carriage 30 and lens carriage 40.

The first carriage 20 can be moved by a drive unit not shown at speed V in parallel with the document glass 11. In this first carriage 20, there are provided a light source 21 and a reflecting mirror 22. The second carriage 30 is provided with reflecting mirrors 31 and 32. The lens carriage 40 is provided with a line sensor 41, which is an optical sensor for reading light sent from a document, and a condenser lens 42 for condensing light, which is sent from the document, to the line sensor 41. The line sensor 41 is composed of a large number of photoelectric transfer elements such as CCD.

When an image is read, the document which is set on the document glass 11 is irradiated with light sent from the light source 21, and light sent from the document is condensed to the line sensor 41 by the condenser lens 42, and luminance of the document is detected and transferred into an electric signal while the first carriage 20 and the second carriage 30 are being moved. In this case, a direction in which the photoelectric transfer elements of the line sensor 41 are arranged is defined as a horizontal scanning direction, and a direction in which the carriage is moved is defined as a vertical scanning direction.

Light sent from the light source 21 is irradiated on the document surface which has been set on the document glass 11. After light has been reflected on the document surface, it is respectively reflected on the reflecting mirror 22 of the first carriage 20, the reflecting mirror 31 of the second carriage 30, and the reflecting mirror 32. After that, light is condensed by the condenser lens 42 of the lens carriage 40 to the line sensor 41. The second carriage 30 can be moved in the same direction as that of the first carriage 20 at a half speed V/2 of the moving speed V of the first carriage 20. Accordingly, even when both the first carriage 20 and the second carriage 30 are moved, an optical path length from the document to the condenser lens 42 can be kept constant. When the optical path length from the document to the condenser lens 42 is changed, the control unit 3 gives a command to the lens motor control means 6, so that the lens carriage 40 can be finely adjusted in the horizontal direction by a motor not shown in the drawing. In this way, the optical path length from the document to the condenser lens 42 can be changed. The control unit 3 and the lens motor control means 6 compose an optical length adjusting means.

The data detecting section 2 converts data of the line sensor 41 into a digital signal and transmits the digital signal to the control unit 3. The control unit 3 is composed of a microcomputer including CPU, RAM and ROM. The control unit 3 controls the overall image reading apparatus 100 and is connected with an external image processing device such as a personal computer (referred to as PC hereinafter) 200 via an interface. The control unit 3 houses control programs for controlling a mirror motor control section 7, which drives the first carriage 20 and the second carriage 30 in the vertical scanning direction, and also for controlling a lens motor control section 6 which finely adjusts the lens carriage 40 in the horizontal direction.

Figure 3:
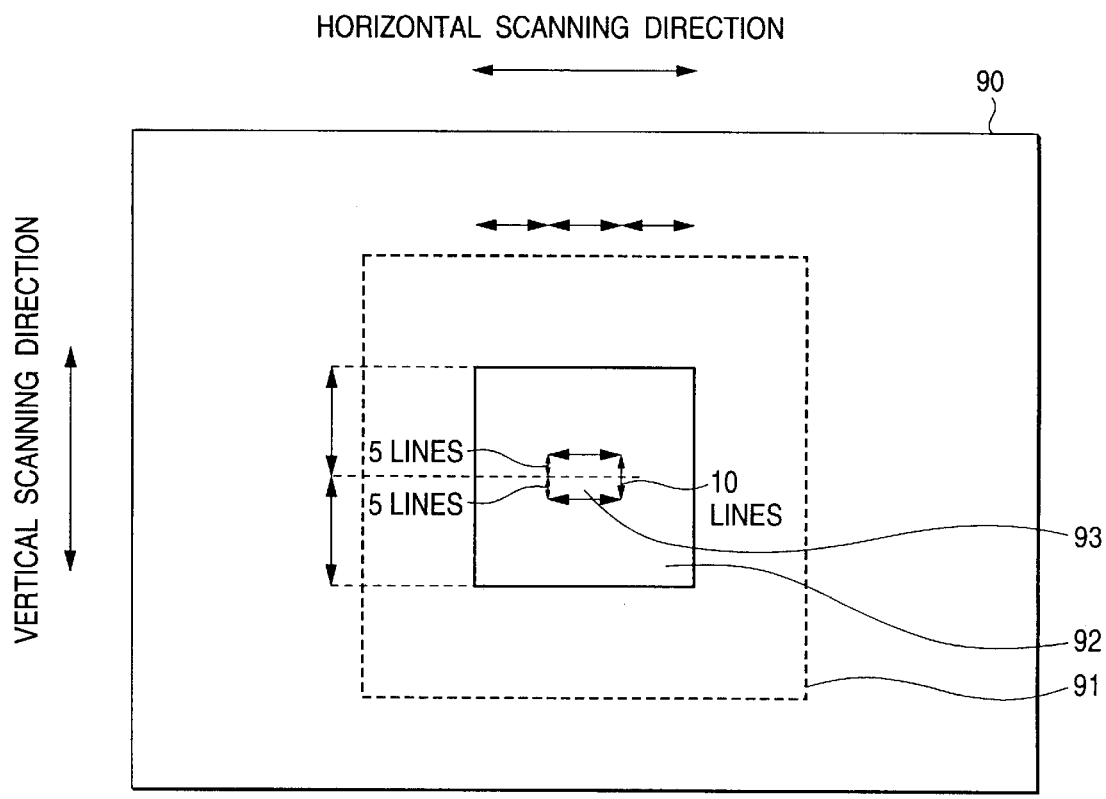
FIG. 3 is a view showing an example of a focus position designating image plane on a document in the first embodiment of the present invention.

FIG. 3 is a view showing an example of a focus position designating image plane on a document in which PC200 is used. First, an operator operates PC200 and transmits a preview signal from PC200 to the image reading apparatus 100. When the image reading apparatus 100 receives a preview signal from the interface 4, the control unit 3 sends a control signal to the mirror motor control section 7, and the first carriage 20 is moved from the head line position of the document glass 11 to the final line position, so that the overall document glass 11 is scanned by a low resolution. The control unit 3 transmits the low resolution image data, which has been obtained from the document on the document glass 11, from the interface 4 to PC200 as preview data.

PC200 processes preview data which has been received from the image reading apparatus 100, and displays a preview image plane 91 of the overall document on the display 90.

The operator operates an input device connected with PC200 such as a mouse and designates a desired region 92 to be taken in on the preview image plane 91. Further, the operator designates automatic focusing. Then, PC200 determines a line at a specific position to be an automatic focusing line (referred to as AF line hereinafter) 93 from the designated region 92 to be taken in. Then, the coordinate data and the automatic focusing indication signal are transmitted to the interface 4 of the image reading apparatus 100. For example, as shown in FIG. 3, AF line 93 can be set at a position of ½ in the region 92 to be taken in the vertical scanning direction, and also AF line 93 can be set in a range of ⅓ at the center in the horizontal scanning direction. After the operator has designated the region 92 to be taken in, he can change the optical path length from the document to the condenser lens 42 by designating the moving distance of the lens carriage 40, so that he can manually adjust the focus. Accordingly, it is possible for the operator to intentionally read the document as a blur image.

In the image reading apparatus 100, when the automatic focusing indication signal and the coordinate data of AF line 93 are received from the interface 4, the control unit 3 sends a control signal to the mirror motor control section 7, so that the first carriage 20 is moved to a position on AF line 93 corresponding to the coordinate data.

In the initial condition, the lens carriage 40 is set at a position so that a face of the document glass 11 on which the document is set can be in focus. This face of the document glass 11 on which the document is set will be referred to as an upper face of the document glass 11. This condition is a reference position, and the moving distance is determined to be 0 mm at this reference position. When the lens carriage 40 is moved so that the optical path length from the document to the condenser lens 42 can be shortened, that is, when the lens carriage 40 is moved so that an upper position of the upper face of the document glass 11 can be in focus, this direction in which the lens carriage 40 is moved is defined as a positive direction, and when the lens carriage 40 is moved so that the optical path length from the document to the condenser lens 42 can be extended, that is, when the lens carriage 40 is moved so that a lower position of the upper face of the document glass 11 can be in focus, this direction in which the lens carriage 40 is moved is defined as a negative direction.

Figure 1:
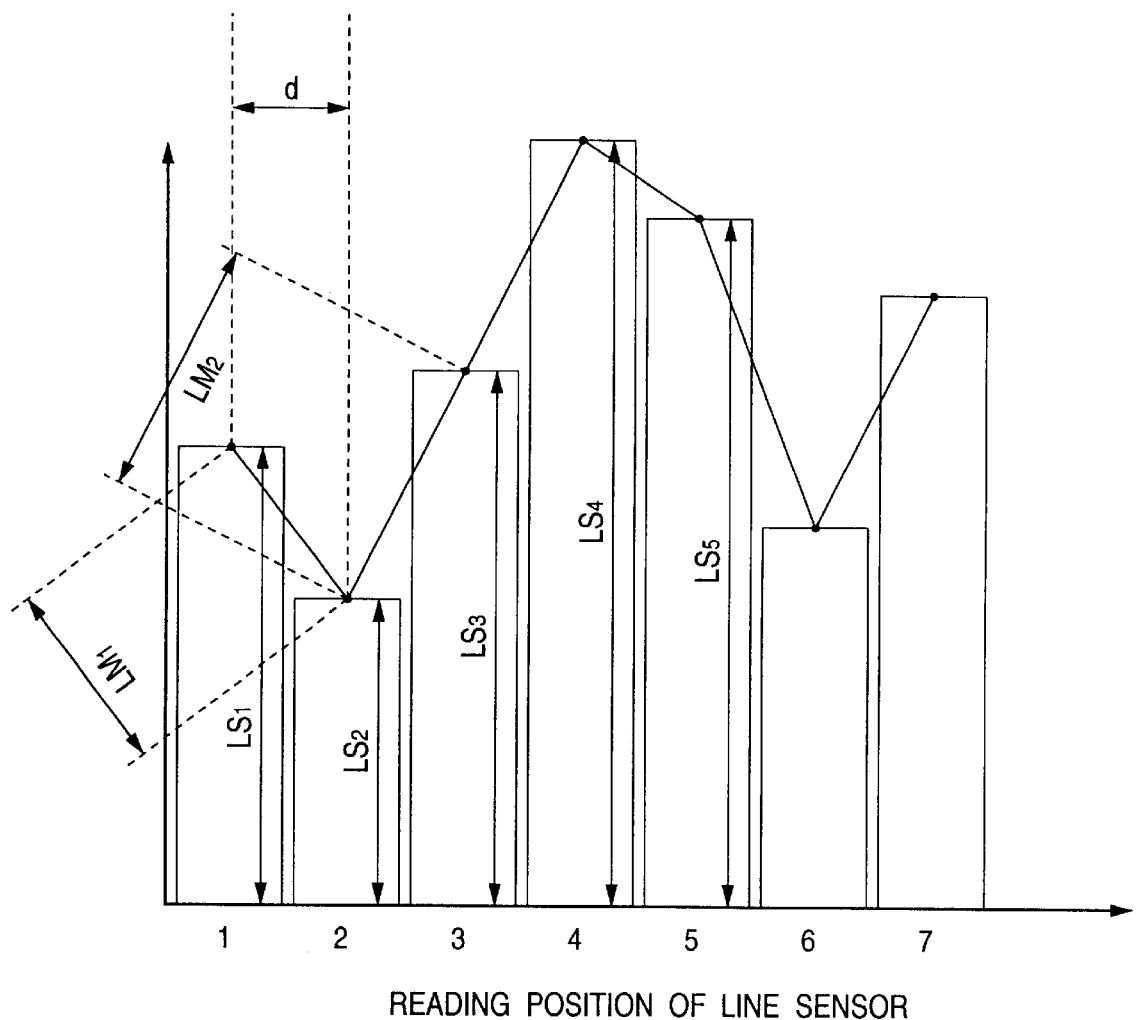
FIG. 1 is a schematic illustration for finding a distance by an output value which has been read on line AF by a line sensor in the first embodiment of the present invention.

In this embodiment, as shown in FIG. 1, when output values obtained when AF line is read by the line sensor 41 are represented by $LS_1$, $LS_2$, $LS_3$, . . . , and when a broken line graph is considered on which the horizontal axis represents a reading position in the horizontal scanning direction and the vertical axis represents an output value, it is judged that the larger the total distance $LM_1+LM_2+ \ldots$ of the broken lines is, the more accurately the image is in focus.

When a distance between the reading positions of reading conducted by the photoelectric transfer elements of the line sensor 41 is a constant d, distance $LM_1$ between the output value of the first photoelectric transfer element and the output value of the second photoelectric transfer element, and distance $LM_2$ between the output value of the second photoelectric transfer element and the output value of the third photoelectric transfer element are represented by the following expressions, which is the same in the successive explanations. Each distance is calculated to be a square root of the sum of the square of a distance between the adjacent reading positions, and the square of a difference of output values at the adjacent reading positions.

$$LM1=((LS1-LS2)^2+d^2)^{1/2}$$

$$LM2=((LS2-LS3)^2+d^2)^{1/2}$$

In this embodiment, the distance is relatively compared. Therefore, constant d may be an arbitrary value. In this case, d=1. Accordingly, total length LMT of the distances with respect to the photoelectric transfer elements, the number of which is n, can be expressed by the following expression.

$$LMT = ((LS_1 - LS_2)^2 + 1^2)^{1/2} + \\ ((LS_2 - LS_3)^2 + 1^2)^{1/2} + \ldots + \\ ((LS_{n-1} - LS_n)^2 + 1^2)^{1/2}$$

Figure 4:
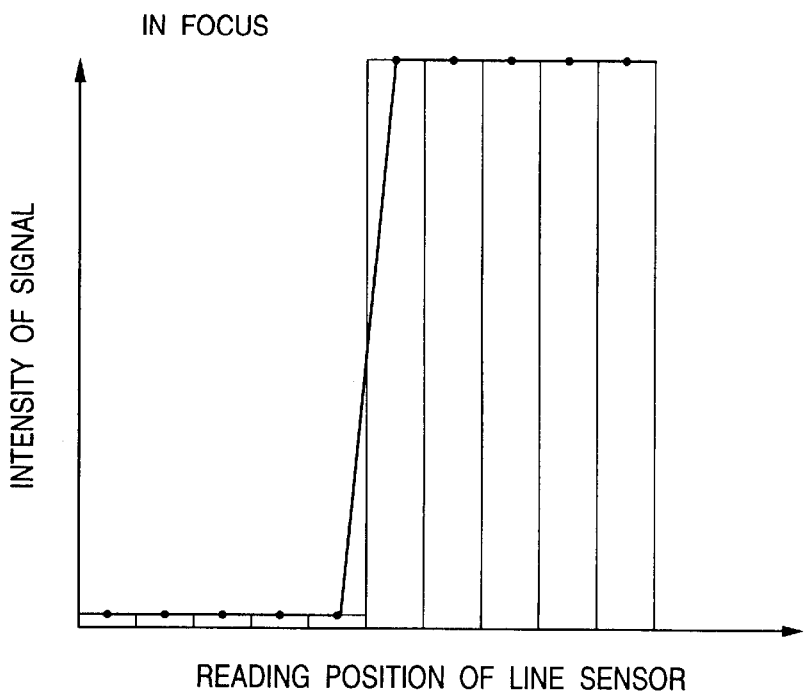
FIGS. 4(A) and (B) are schematic illustrations showing a model of an output of a line sensor when a document having a large white solid portion and a large black solid portion is read under the condition that an image on the document is in focus and also under the condition that an image on the document is out of focus.
Figure 4:
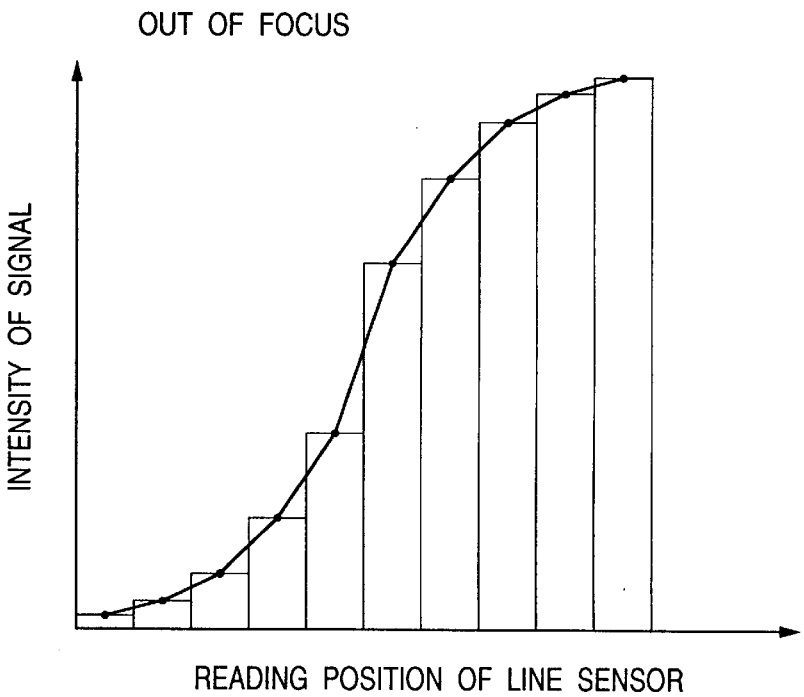

FIG. 4 is a schematic illustration showing an output of the line sensor 41 when a document having a large white solid portion and a large black solid portion is read under the condition that the image is in focus and also under the condition that the image is out of focus. Under the condition that the image is in focus, the output shown in FIG. 4(A) is obtained. Under the condition that the image is out of focus, the output shown in FIG. 4(B) is obtained. When the degree of contrast is calculated by calculating a total of absolute values of differences between the maximum and the minimum of luminance on the image which has been read by the conventional method, or when the degree of contrast is calculated by calculating a total of absolute values of the differences between the reading values of the adjacent elements, the substantially same value can be obtained in the cases of FIGS. 4(A) and 4(B). Therefore, it is difficult to accurately detect a position at which the image is in focus. On the other hand, in this embodiment, total length LMT in the case of FIG. 4(A) becomes longer than that in the case of FIG. 4(B). Therefore, when it is judged that the longer the total length LMT is, the more accurately the image is in focus, the focus position can be accurately detected.

Figure 5:
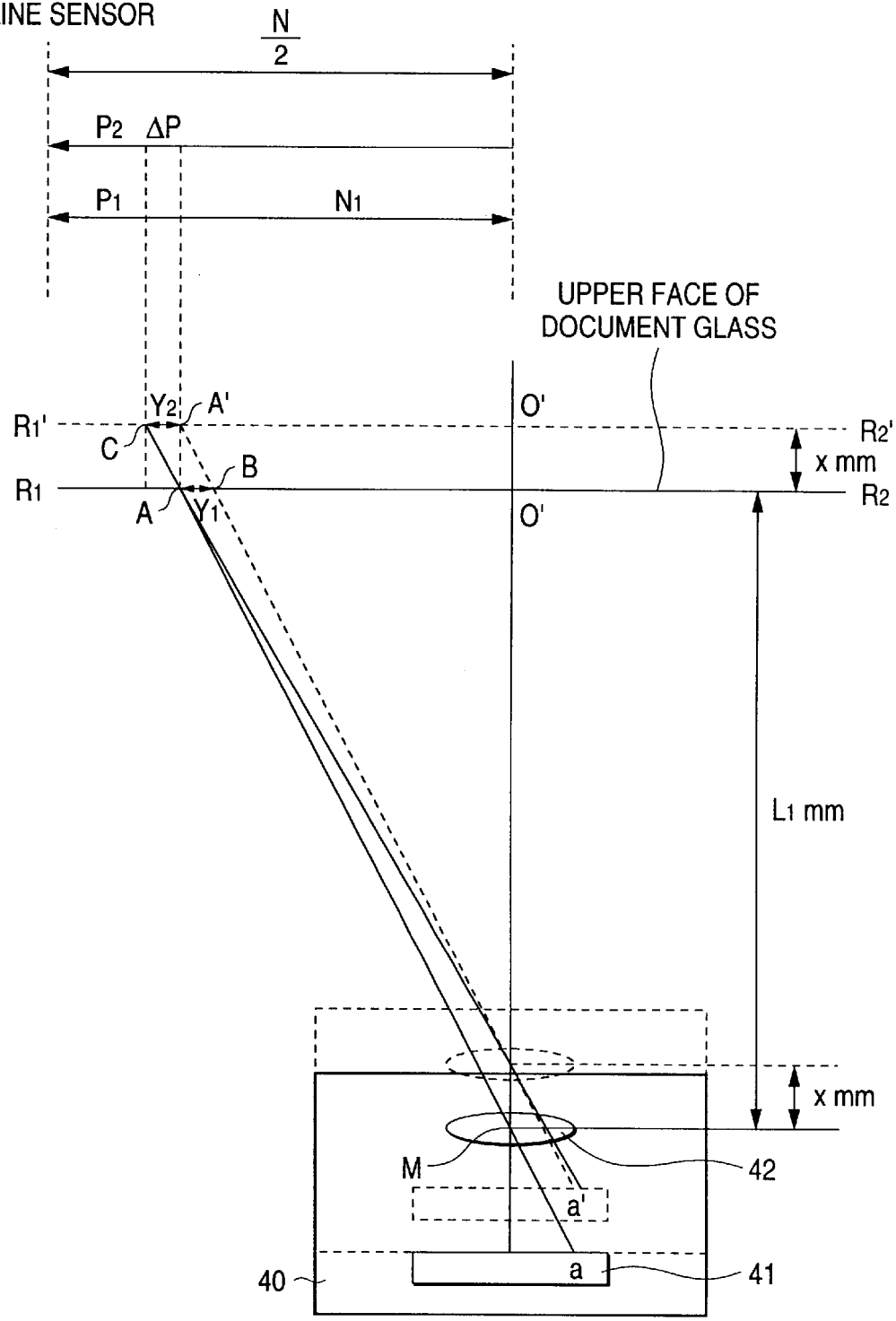
FIG. 5 is a schematic illustration for explaining a slippage of a reading position caused when a lens carriage is moved in an image reading apparatus of the first embodiment of the present invention.

In this case, as shown in FIG. 5, at the reference position at which line $R_1$–$R_2$ on the upper face of the document glass 11 is in focus, a distance from line $R_1$–$R_2$ to principal point M of the condenser lens 42 is $L_1$, and point A on line $R_1$–$R_2$ is read by the photoelectric transfer element at point "a" on the line sensor 41 via the condenser lens 42. When the number of all photoelectric transfer elements of the line sensor 41 is N, point "a" is a photoelectric transfer element, the order of which is $P_1$ from the end of the line sensor 41, that is, point "a" is a photoelectric transfer element, the order of which is $N_1$ from the center of the line sensor 41, and $N_1=(N/2)-P_1$.

When the lens carriage 40 including the condenser lens 42 and the line sensor 41 is moved in the positive direction by x mm, point A' located in an upper portion of the upper face of the document glass 11 by distance x mm from point A is in focus corresponding to the photoelectric element at point "a". Accordingly, the photoelectric element of the line sensor, the order of which is $P_1$, reads point B on line $R_1$–$R_2$ which is distant from point A by $Y_1$ mm.

When the distance from the upper face of the document glass 11 to the condenser lens 42 is changed by moving the lens carriage 40, the position of the document to be read by the same photoelectric element of the line sensor 41 is changed due to the field angle characteristic of the condenser lens 42. The photoelectric transfer element for reading point A after the lens carriage 40 has been moved must be changed to a photoelectric transfer element which reads point C on line $R_1'$–$R_2'$ distant from point A' by $Y_2$ mm in an upper portion of the upper face of the document glass 11 which is distant by x mm. That is, it is necessary to read line $R_1$–$R_2$ by the photoelectric transfer element, the order of which is $P_2$, which is shifted from the photoelectric transfer element, the order of which is $P_1$, by $\Delta P$. Triangle OMA is similar to triangle AA'B, and a length of line OA is proportional to $N_1$, and a length of line $Y_2$ is proportional to $\Delta P$. Value x is sufficiently small with respect to $L_1$, and it is possible to assume that $Y_2 \approx Y_1$. Accordingly, the following expression is established.

$$L_1/(N/2-P_1)=x/(\Delta P)$$

Therefore, position $P_2$ of the photoelectric transfer element on the line sensor 41 after the change can be expressed as follows.

$$P=P_1-(\Delta P)=P_1+((P_1-(N/2))x)/L_1$$

Even if the distance from the upper face of the document glass 11 to the condenser lens 42 is changed by moving the lens carriage as described above, when position $P_2$ of the photoelectric transfer element used for reading is found according to the moving distance x of the lens carriage 40 and also according to position $P_1$ of the photoelectric transfer element which conducts reading at the reference position, the same portion of the document in the horizontal scanning direction is read, and the focusing can be adjusted.

Figure 6:
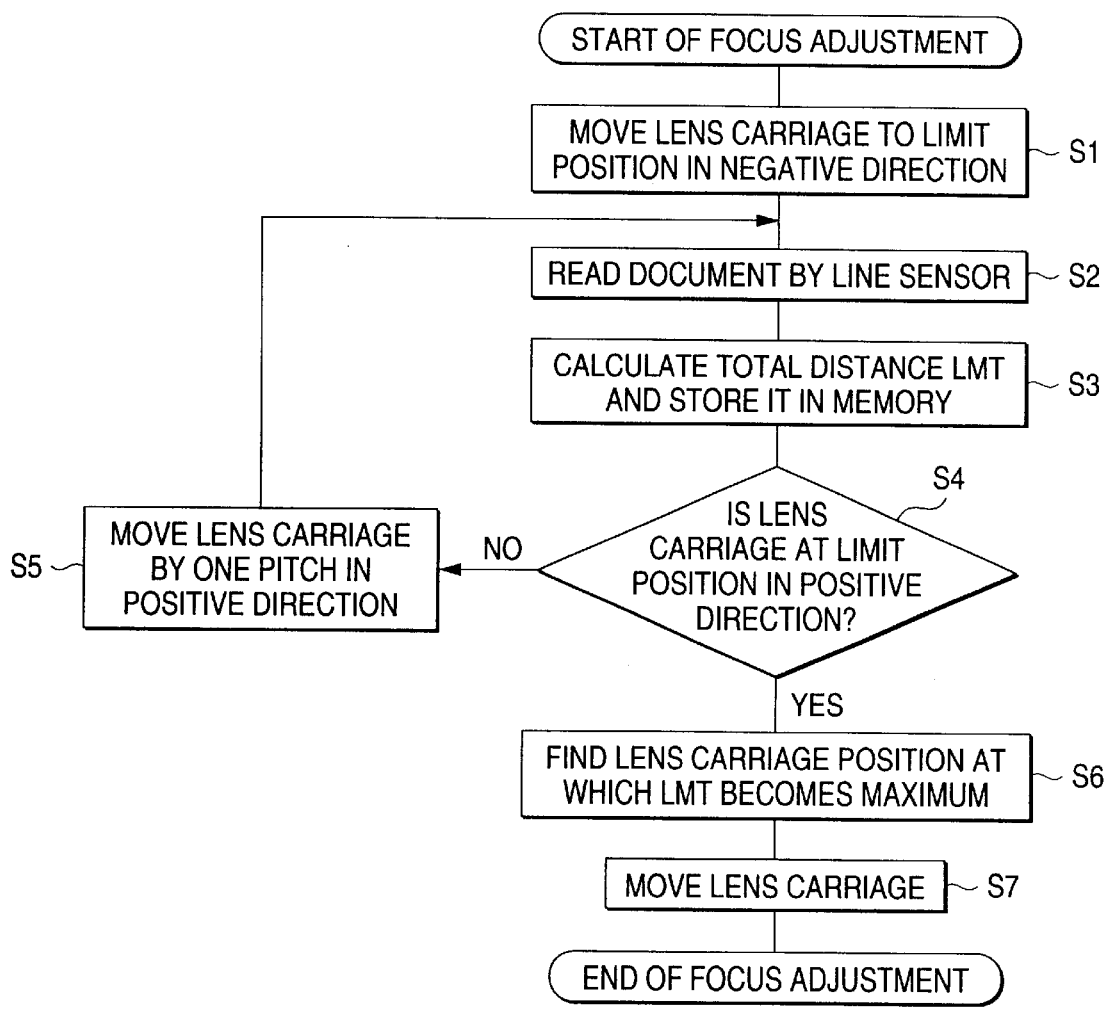
FIG. 6 is a flow chart showing a focus adjusting method of the first embodiment of the present invention.

FIG. 6 is a flow chart showing a procedure for detecting a focusing position in this embodiment.

In the case of focusing, first, the lens carriage 40 is moved to a limit in the negative direction in step S1, that is, the lens carriage 40 is moved to a position distant from the reference position by −3.0 mm in this embodiment.

In step S2, the light source 21 is turned on, so that the document is irradiated with light sent from the light source 21, and light condensed to the photoelectric transfer element in a predetermined range of the line sensor 41 is converted into an electric signal. The thus converted signal is digitized by the data detecting section 2 and stored in the memory of the control unit 3.

In step S3, according to the reading data which has been digitized in step S2, total distance LMT is calculated by CPU of the control unit 3 and stored in the memory of the control unit 3 together with a position of the lens carriage 40.

Next, in step S4, it is judged whether or not the lens carriage 40 is located at a limit position in the positive direction, that is, it is judged whether or not the lens carriage 40 is located at a position of 3.0 mm in this embodiment. When the lens carriage 40 is located at the limit position, the program proceeds to step S6. Unless the lens carriage 40 is located at the limit position, the lens carriage 40 is moved in the positive direction by a predetermined pitch in step S5, that is, the lens carriage 40 is moved in the positive direction by 0.5 mm in this embodiment, and the program returns to step S2 and the reading of the document is repeated.

In step S6, a position of the lens carriage 40 is found at which a value of LMT stored in the memory of the control unit 3 becomes maximum. In step S7, the lens carriage 40 is moved to the position which has been found in step S6. In this way, adjusting the focus is completed.

Second Embodiment

In the first embodiment, AF line is composed of one line. In the case where the direction of moving of the lens carriage 40 is not perfectly parallel to the optical path, the reading position is shifted in the vertical scanning direction when the lens carriage 40 is moved. In order to reduce an error caused by the slippage of the reading position in the vertical scanning direction, a plurality of AF lines are read, and a total LMTT of LMT on each AF line is calculated. When the totals are compared with each other, it possible to detect a focusing position.

Figure 7:
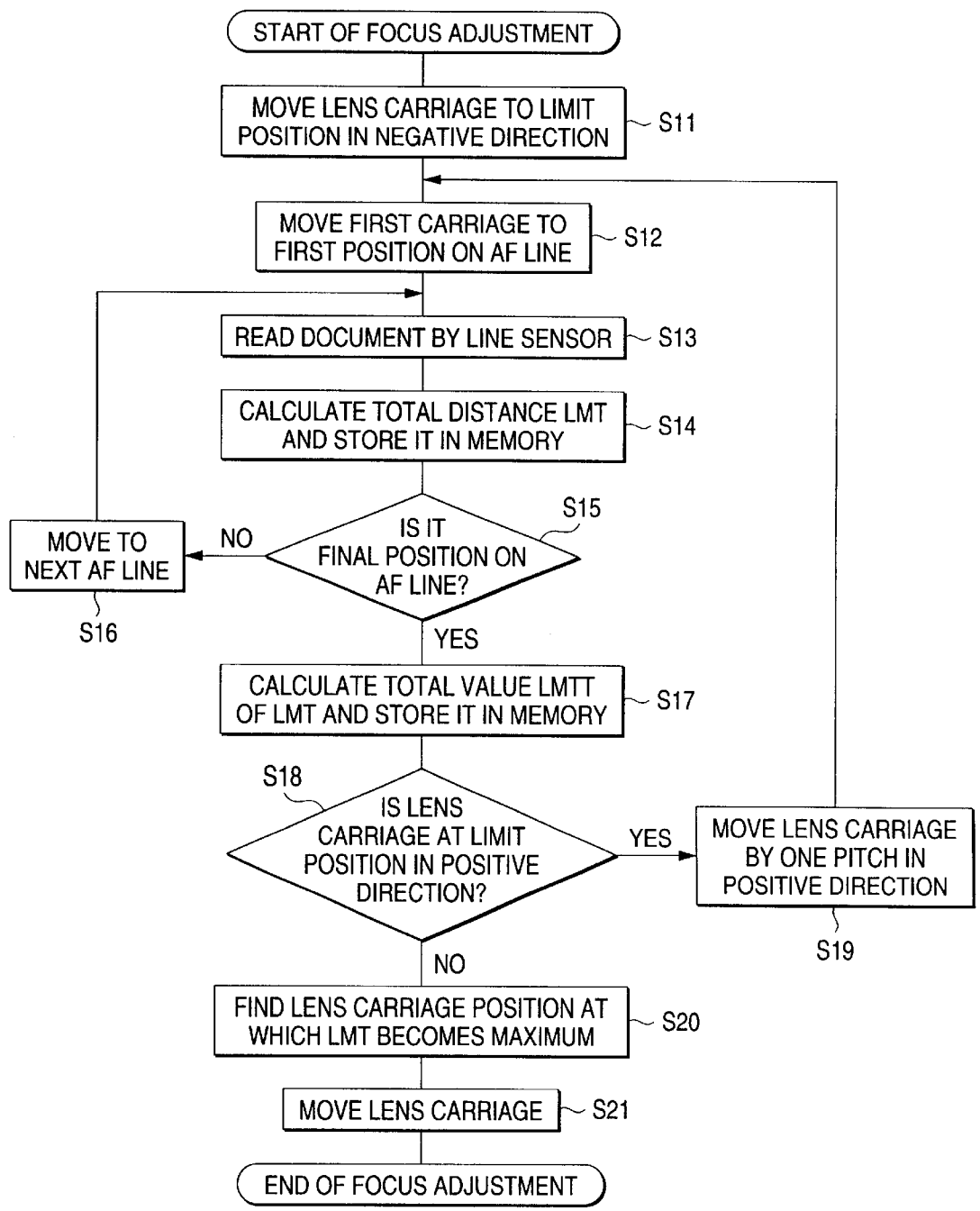
FIG. 7 is a flow chart showing a focus adjusting method of the second embodiment of the present invention.

FIG. 7 is a flow chart showing a procedure for detecting a focusing position in the second embodiment of the present invention.

In the case of focusing, first, the lens carriage 40 is moved to a limit in the negative direction in step S11, that is, the lens carriage 40 is moved to a position distant from the reference position by −3.0 mm in this embodiment.

In step S12, the first carriage 20 is moved to the first position on AF line.

In step S13, the light source 21 is turned on, so that the document is irradiated with light sent from the light source 21, and light condensed to the photoelectric transfer element in a predetermined range of the line sensor 41 is converted into an electric signal. The thus converted signal is digitized by the data detecting section 2 and stored in the memory of the control unit 3.

In step S14, according to the reading data which has been digitized in step S13, total distance LMT is calculated by CPU of the control unit 3 and stored in the memory of the control unit 3.

In step S15, it is judged whether or not the reading line is at the final position of AF line, that is, in this embodiment, it is judged whether or not the reading line is at tenth line from the start position of AF line. When the reading line is at the tenth line from the start position of AF line, the program proceeds to step S17. When the reading line is not at the tenth line from the start position of AF line, the first carriage 20 is moved by one line in step S16, and then the program is returned to step S13, and the calculation of total distance LMT is repeated on the next line.

In step S17, LMT on each AF line is totaled to find LMTT, and LMTT is stored in the memory of the control unit 3 together with the position of the lens carriage 40.

Next, in step S18, it is judged whether or not the lens carriage 40 is located at a limit position in the positive direction, that is, it is judged whether or not the lens carriage 40 is located at a position of 3.0 mm in this embodiment. When the lens carriage 40 is located at the limit position, the program proceeds to step S20. Unless the lens carriage 40 is located at the limit position, the lens carriage 40 is moved in the positive direction by a predetermined pitch in step S19, that is, the lens carriage 40 is moved in the positive direction by 0.5 mm in this embodiment, and the program returns to step S12 and the calculation of total value of LMTT of the total distance LMT is repeated.

In step S20, a position of the lens carriage 40 is found at which a value of LMTT stored in the memory of the control unit 3 becomes maximum. In step S21, the lens carriage 40 is moved to the position which has been found in step S20. In this way, adjustment of focusing is completed.

Figure 8:
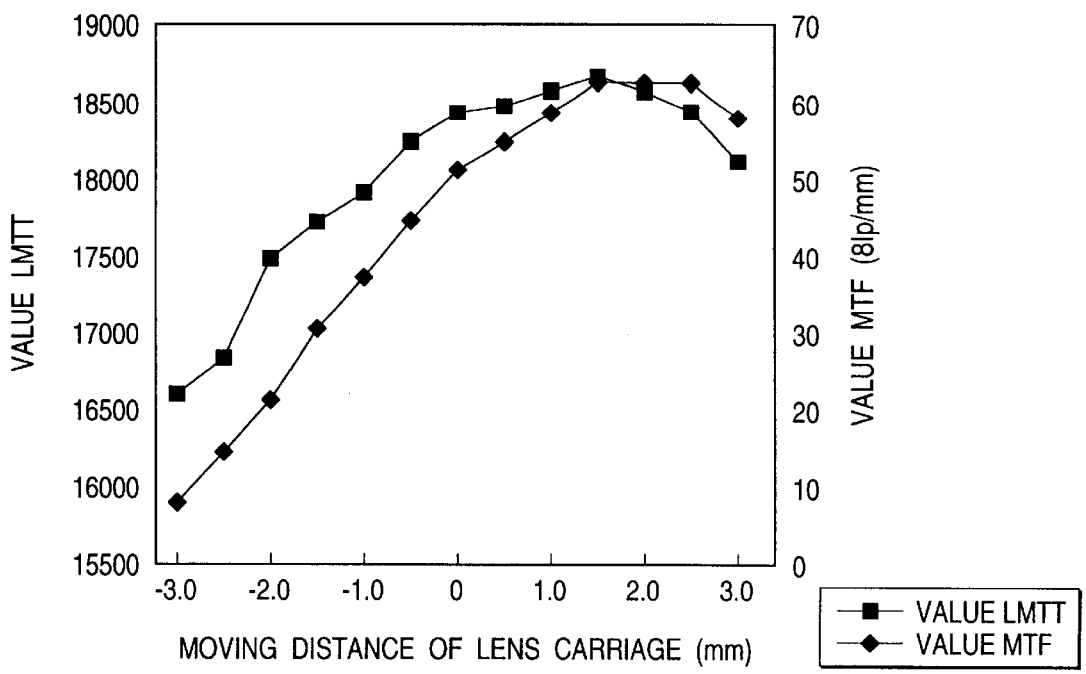
FIG. 8 is a characteristic diagram showing a relation between a moving distance of a lens carriage and LMTT and also showing a relation between a moving distance of a lens carriage and MTF in the second embodiment of the present invention.

In FIG. 8, values of LMTT according to moving distances of the lens carriage 40 in the case where AF line composed of 10 lines in the vertical scanning direction and 640 points in the horizontal scanning direction is read with respect to a document of a natural picture, are compared with values of MTF which have been found when a rudder chart of 81 p/mm (including 8 line pairs in a range of 1 mm) is read and also when a general evaluation test is made. Values of MTF can be found from the maximum $S_{max}$ and the minimum $S_{min}$ of a signal, which is obtained when the rudder chart is read, by the following expression.

$$MTF=((S_{max}-S_{min})/(S_{max}+S_{min}))\times100(\%)$$

As shown in FIG. 8, the waveform of the graph of values of LMTT is the same as the waveform of the graph of values of MTF, and an error of the peak position is 0.5 mm. A value of MTF at the peak position of the value of LMTT is substantially the same as the maximum of the value of MTF. Therefore, when the peak position of the value of LMTT is detected, it is possible to detect a substantial focusing position.

Third Embodiment

In the second embodiment, when a plurality of continuous AF lines are read, the focus is adjusted. However, it is possible to adjust the focus when a plurality of AF lines are read at intervals.

In the third embodiment of the present invention, five AF lines are read on every other line. Therefore, while the reading time is being shortened, it is possible to ensure a reading range which approximately corresponds to 10 lines.

Figure 9:
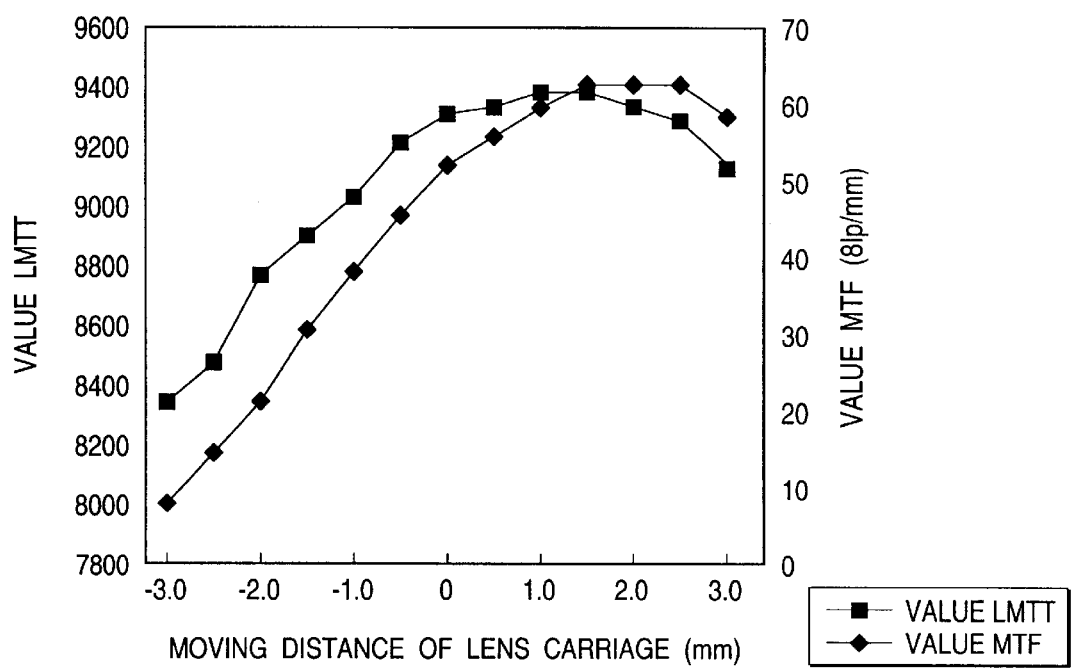
FIG. 9 is a characteristic diagram showing a relation between a moving distance of a lens carriage and LMTT and also showing a relation between a moving distance of a lens carriage and MTF in the third embodiment of the present invention.

In FIG. 9, values of LMTT according to moving distances of the lens carriage 40 in the case where AF line composed of 5 lines in every other line in the vertical scanning direction and 640 points in the horizontal scanning direction is read with respect to a document of a natural picture, are compared with values of MTF which have been found when a rudder chart of 81 p/mm (including 8 line pairs in a range of 1 mm) is read and a general evaluation test is made.

In the same manner as that of the second embodiment, the waveform of the graph of values of LMTT is the same as the waveform of the graph of values of MTF, and an error of the peak position is 0.5 mm. A value of MTF at the peak position of the value of LMTT is substantially the same as the maximum of the value of MTF. Therefore, when the peak position of the value of LMTT is detected, it is possible to detect a focusing position. Accordingly, while a focus adjusting time is being shortened by reducing the number of reading lines compared with the second embodiment, the substantially same effect as that of the second embodiment can be provided.

Fourth Embodiment

In the first to the third embodiment, a position of the lens carriage 40 is detected as follows. The lens carriage 40 is moved from a position at which the optical path length is longest to a position at which the optical path length is shortest by a predetermined pitch, and a document is read at each position. Total distance LMT or total LMT of the total distance on a plurality of lines is calculated, and a position of the lens carriage 40 at which LMT or LMTT becomes maximum is detected. For example, when the lens carriage 40 is moved from a position of −3.0 mm to a position of 3.0 mm with respect to a reference position by the pitch of 0.5 mm as shown in the above example, it is necessary to conduct reading and calculating by 13 times.

Figure 10:
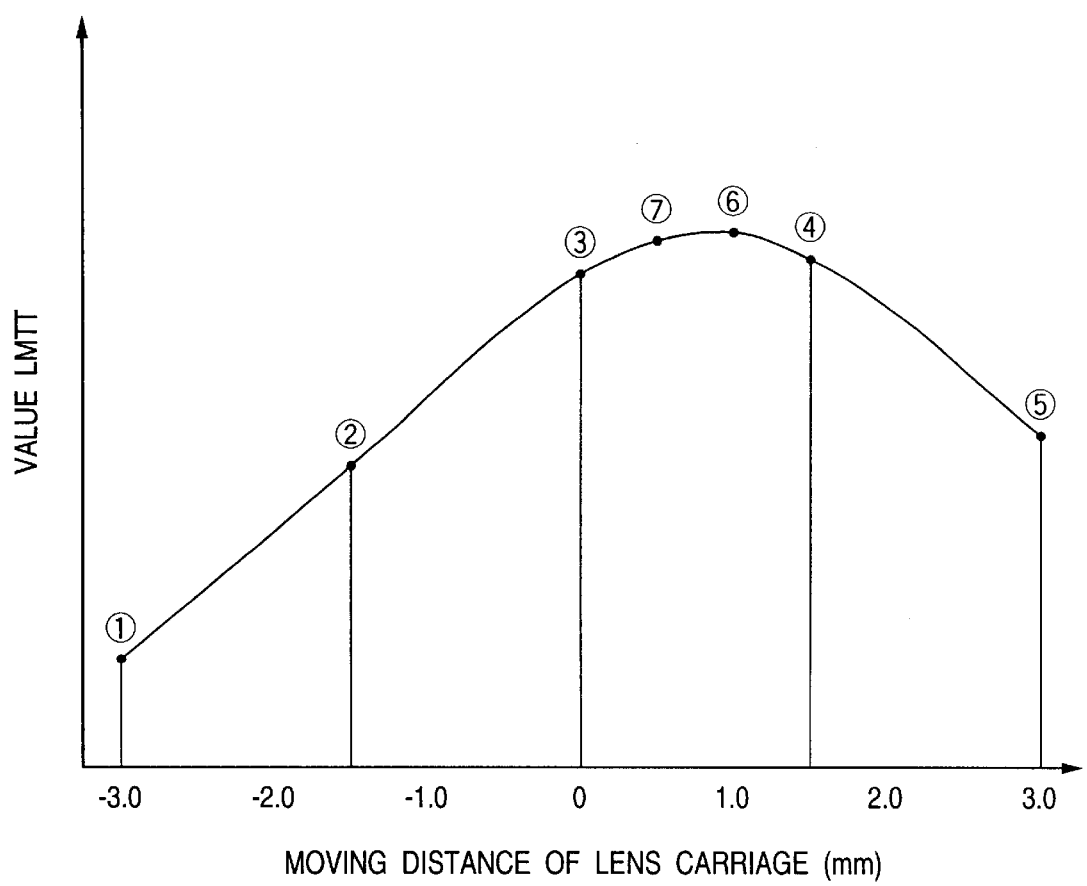
FIG. 10 is a schematic illustration for explaining a method of finding a focusing position in the fourth embodiment of the present invention.

In the fourth embodiment of the present invention, as shown in FIG. 10, first, the lens carriage 40 is roughly moved from the position of −3.0 mm to the position of 3.0 mm with respect to the reference position by the pitch of 1.5 mm, and reading and calculating are conducted at five positions of (1) to (5). Next, a position at which a calculated value of LMT or LMTT is highest is detected in the five positions of (1) to (5), and also a position at which a calculated value is highest is detected in the adjoining positions. In the example shown in FIG. 10, (3) and (4) are detected. Then, the lens carriage 40 is minutely moved by a pitch of 0.5 mm between the positions of (3) and (4), and reading and calculating are conducted at the positions of (6) and (7). Concerning the position at which LMTT becomes maximum in the positions of (3), (4), (6) and (7), in the example shown in FIG. 10, LMTT becomes maximum at the position of (6). Accordingly, the focusing position can be detected by the pitch of 0.5 mm in the reading conducted by 7 times. As described above, this embodiment is more advantageous than the first to the third embodiment in that the times of reading a document until a position at which the distance becomes maximum can be reduced, and the times of calculation conducted until a position at which the distance becomes maximum can be also reduced. Accordingly, the focusing time can be shortened.

According to the above focus adjusting method, a position separate from the document glass surface can be in focus. Therefore, it becomes possible to read an image most appropriately.

Even when an optical path length from the document to the condenser lens is changed, it is possible to make the image reading range to be the same. Accordingly, for example, when an operator wants an image to be intentionally out of focus, it is possible to read the image in the same range as that of the image which is in focus.

Figure 11:
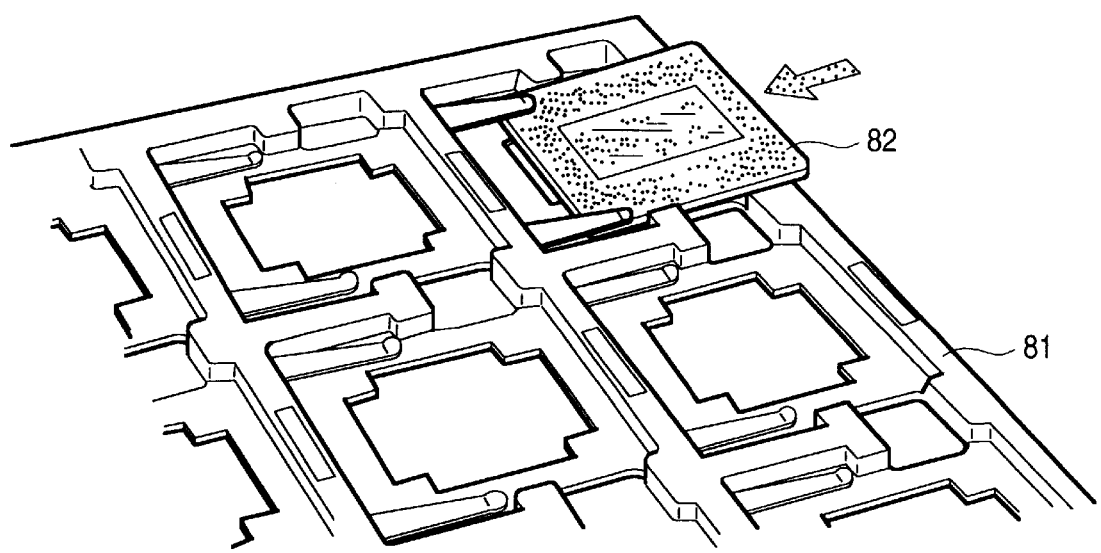
FIG. 11 is a perspective view showing an example of a film holder used in the case of reading a film of a transmission type document in an embodiment of the present invention.

In the above example, explanation is made into an image forming apparatus in which a reflection document is set on the document glass 11, and the document is irradiated with light sent from the light source 21 arranged on the lower side of the document glass 11. However, the present invention can provide the same effect even when an image forming apparatus is used in which a transmission document is irradiated with light sent from an upper portion of the document glass. For example, of course, it is possible to apply the present invention to a case in which a transmission document such as a negative film 82 is held by a film holder 81 shown in FIG. 11, and the film 82 is set at a position separate from the document glass surface.

When the film 82, which is a transmission document, is read by a conventional flat bed type scanner, it is necessary to directly set the film 82 on the document glass surface so that an image on the film 82 can be in focus. Due to the foregoing, interference is caused between the film 82 and the document glass when light is irradiated by a light source, that is, interference fringes, which are referred to as Newton Ring, are generated, and the quality of an image, which has been read by the scanner, is impaired. Further, since the film surface and the glass surface are rubbed with each other, the film 82 is damaged by dust and things like that. However, according to the present invention, the above problems can be solved by using the film holder 81.

Industrial Possibility

According to the image reading apparatus and the focus adjusting method of the present invention, the condenser lens and the optical sensor are integrally moved. Therefore, it is possible to adjust the focus without using a complicated moving mechanism.

The value showing the degree of focusing is a total of the square root of the sum of the square of a predetermined value corresponding to a distance between the adjacent reading positions to be read by the optical sensor, and the square of a difference of luminance signals at the adjacent reading positions. Accordingly, even in the case of an image having a large solid black region and large solid white region, that is, even in the case of an image, the space frequency of which is low, it is possible to conduct focusing accurately.

Further, according to the present invention, a total of the values showing the degree of focusing on a plurality of lines can be maximized. Accordingly, even when the document reading position deviates in the vertical scanning direction in the process of adjusting the focus, an error caused by the deviation can be reduced by using the total of the values showing the degree of focusing on a plurality of lines. Therefore, focusing can be accurately conducted.

Positions of the photoelectric transfer elements on the line sensor used for reading are corrected according to the optical path length. Due to the foregoing, it is possible to read an image of the same range of the line sensor in the horizontal scanning direction before and after a change in the optical path length. Therefore, the focus can be adjusted more accurately.

What is claimed is:

1. An image reading apparatus comprising:
   a condenser lens for condensing light sent from a document;
   an optical sensor for converting light sent from the condenser lens into an electric signal;
   an optical path length adjusting means for integrally moving the condenser lens and the optical sensor so as to adjust an optical path length between the document and the condenser lens;

a calculating means for storing a signal obtained when the optical sensor reads a reading line on the document by a plurality of optical path lengths and also for calculating a value showing the degree of focusing at each optical path length; and a control means for giving a command to the optical path length adjusting means so that the value showing the degree of focusing is maximized.

2. An image reading apparatus according to claim 1, wherein the optical sensor is a line sensor having a plurality of photoelectric transfer elements.

3. An image reading apparatus according to claim 1 or 2, wherein a value showing the degree of focusing is a total of the square root of the sum of the square of a predetermined value corresponding to a distance between the adjacent reading positions to be read by the optical sensor, and the square of a difference of luminance signals at the adjacent reading positions.

4. A focus adjusting method of an image reading apparatus in which light sent from a document is condensed by a condenser lens and converted into an electric signal by an optical sensor, the focus adjusting method comprising the steps of:

(a) moving the condenser lens and the optical sensor integrally so as to adjust an optical path length between the document and the condenser lens;

(b) reading luminance of a reading line on the document by the optical sensor and converting the luminance into an electric signal;

(c) calculating a value showing the degree of focusing by the electric signal obtained in step (b);

(d) repeating steps (a), (b) and (c) by a plurality of optical path lengths;

(e) finding an optical path length by which the value showing the degree of focusing is maximized; and (f) adjusting an optical path length so that it is the optical path length found in step (e).

5. A focus adjusting method of an image reading apparatus according to claim 4, wherein the optical sensor is a line sensor having a plurality of photoelectric transfer elements.

6. A focus adjusting method of an image reading apparatus according to claim 4 or 5, wherein a step for calculating a value showing the degree of focusing is a step for calculating a total of the square root of the sum of the square of a predetermined value corresponding to a distance between the adjacent reading positions, and the square of a difference of the electric signals at the adjacent reading positions.

7. An image reading apparatus comprising:

a condenser lens for condensing light sent from a document;

a line sensor having a plurality of photoelectric transfer elements for converting light sent from the condenser lens into an electric signal;

an optical path length adjusting means for adjusting an optical path length between the document and the condenser lens;

a calculating means for storing a signal obtained when the line sensor reads a plurality of reading lines on the document and also for calculating a value showing the degree of focusing at each line; and a control means for giving a command to the optical path length adjusting means so that a sum of the values showing the degree of focusing on a plurality of lines is maximized.

8. An image reading apparatus according to claim 7, wherein the optical path length adjusting means is a means for moving the condenser lens and the line sensor integrally.

9. An image reading apparatus according to claim 7 or 8, wherein a value showing the degree of focusing is a total of the square root of the sum of the square of a predetermined value corresponding to a distance between the adjacent reading positions to be read by the optical sensor, and the square of a difference of luminance signals at the adjacent reading positions.

10. A focus adjusting method of an image reading apparatus in which light sent from a document is condensed by a condenser lens and converted into an electric signal by a line sensor composed of a plurality of photoelectric transfer elements comprising the steps of:

(a) adjusting an optical path length between the condenser lens and the document;

(b) reading a plurality of lines on the document by the line sensor and calculating a value showing the degree of focusing on each line;

(c) repeating processes (a) and (b) by a plurality of optical path lengths;

(d) finding an optical path length by which a value showing the degree of focusing is maximized on the plurality of lines; and (e) adjusting an optical path length between the condenser lens and the document so that it is the optical path length found in step (d).

11. A focus adjusting method of an image reading apparatus according to claim 10, wherein the optical path length adjusting step is a step in which the condenser lens and the line sensor are integrally moved.

12. A focus adjusting method of an image reading apparatus according to claim 10 or 11, wherein a step for calculating a value showing the degree of focusing is a step for calculating a total of the square root of the sum of the square of a predetermined value corresponding to a distance between the adjacent reading positions, and the square of a difference of the electric signals at the adjacent reading positions.

13. A focus adjusting method of an image reading apparatus according to one of claims 10 and 11, wherein a plurality of lines are read in step (b) at intervals.

14. An image reading apparatus comprising:

a condenser lens for condensing light sent from a document;

a line sensor having a plurality of photoelectric transfer elements for converting light sent from the condenser lens into an electric signal;

an optical path length adjusting means for adjusting an optical path length between the document and the condenser lens; and a means for correcting positions of the photoelectric transfer elements on the line sensor used for reading according to the optical path length.

15. An image reading apparatus according to claim 14, further comprising;

a means for calculating a value showing the degree of focusing on a plurality of optical path lengths when the document is read by the photoelectric transfer elements, the positions of which have been corrected, on the line sensor; and a control means for giving a command to the optical path length adjusting means so that a value showing the degree of focusing is maximized.

16. An image reading apparatus according to claim 14 or 15, wherein a value showing the degree of focusing is a total of the square root of the sum of the square of a predetermined value corresponding to a distance between the adjacent reading positions to be read by the optical sensor, and the square of a difference of luminance signals at the adjacent reading positions.

17. A focus adjusting method of an image reading apparatus in which light sent from a document is condensed by a condenser lens and converted into an electric signal by a line sensor composed of a plurality of photoelectric transfer elements comprising the steps of:

(a) adjusting an optical path length between the condenser lens and the document;

(b) correcting positions of the photoelectric transfer elements on the line sensor used for reading according to the optical path length;

(c) calculating a value showing a value of the degree of focusing when the document is read by the photoelectric transfer elements located at the corrected positions on the line sensor;

(d) repeating steps (b) and (c) by a plurality of optical path lengths;

(e) finding an optical path length by which a value showing the degree of focusing is maximized; and (f) adjusting an optical path length between the condenser lens and the document so that it is the optical path length found in step (e).

18. A focus adjusting method of an image reading apparatus according to claim 17, wherein a step for calculating a value showing the degree of focusing is a step for calculating a total of the square root of the sum of the square of a predetermined value corresponding to a distance between the adjacent reading positions, and the square of a difference of the electric signals at the adjacent reading positions.

* * * * *